United States Patent [19]
Washio et al.

[11] Patent Number: 5,467,202
[45] Date of Patent: Nov. 14, 1995

[54] DIGITAL COPYING APPARATUS WITH A DISPLAY

[75] Inventors: Koji Washio; Kazuyoshi Tanaka; Satoshi Haneda, all of Hachioji, Japan

[73] Assignee: Konica Corporation, Tokyo, Japan

[21] Appl. No.: 976,257

[22] Filed: Nov. 13, 1992

[30] Foreign Application Priority Data

Nov. 19, 1991 [JP] Japan .................................. 3-303460
Dec. 4, 1991 [JP] Japan .................................. 3-320567

[51] Int. Cl.6 .............................. H04N 1/40; H04N 1/46
[52] U.S. Cl. ........................ 358/448; 358/404; 358/500; 358/530
[58] Field of Search ................................ 395/131, 146; 358/503, 534, 537, 523, 527, 515, 517, 518, 520, 500, 448, 404, 444, 524, 530, 461

[56] References Cited

U.S. PATENT DOCUMENTS 4,979,031 12/1990 Tsuboi et al. .............................. 358/75

FOREIGN PATENT DOCUMENTS

| 0269334A2 | 6/1988 | European Pat. Off. | H04N 1/46 |
| 0310388A1 | 4/1989 | European Pat. Off. | H04N 1/46 |
| 0350870A2 | 1/1990 | European Pat. Off. | H04N 1/46 |
| 0363988A2 | 4/1990 | European Pat. Off. | H04N 1/40 |
| 0441609A2 | 8/1991 | European Pat. Off. | H04N 1/46 |

Primary Examiner—Scott A. Rogers
Assistant Examiner—Jerome Grant, II
Attorney, Agent, or Firm—Finnegan, Henderson, Farabow, Garrett & Dunner

[57] ABSTRACT

An apparatus for copying a document in which an operation unit is provided separately from a copying unit. The operation unit includes a memory to store the digital image signals inputted from the copying unit, a display to display the digital image on a screen, and an operation board to convert the display image into a desired image. The copy unit makes a copy image corresponding to the desired image on a recording material.

15 Claims, 9 Drawing Sheets

DIGITAL COPYING APPARATUS WITH A DISPLAY

BACKGROUND OF THE INVENTION

There has been an increase in the number of the additive functions of the copying machine, resulting in a complicated operation to such an extent that the user cannot make use of all functions. Since he does not know how copying is performed, he has to make several test copies to get a copy having the desired dimensions, layout and colors. Since he is not very fond of such test copies, he has often avoided using effective additive functions. To assist understanding of the user for solution of this problem, a little larger display unit has been provided, and the messages have been displayed in kanji (Chinese characters) or hiragana (Japanese characters), or editors or a variety of semiautomatic functions have been added, which have been insufficient in the following respects: For example, it is not easy for the user to determine what magnification should be selected to get the desired size in the case of the zooming function. Some machines provide the automatic magnification setting function; however, since it uses the method of calculating magnification according to the specified paper size, it cannot meet the requirement of magnifying part of the original, for example.

Some machines calculate the magnification rate from input values on the coordinates, but this requires precise user operation, often resulting in operation errors. With respect to density adjustment and color balance, several test copies must often be taken to determine the influence given to the picture by one graduation on the adjust button. Namely, the display on the conventional control section has failed to determine if the current setting is correct to get the desired copy style, therefore, a considerable experience has been required to make an effective use of the additive function without test copies. Furthermore, the unit price for the full-color copy has been much higher than that of the black/white copy, so it is uneconomical to take many test copies.

The primary objective of the present invention is to provide the digital copying machine featuring extremely excellent maneuverability, which permits pictorial confirmation of the copy style, to ensure precise operation of the additive function by eliminating the need of test copies when the additive function is used, as described above.

The present invention relates to the color balance control device which, as the said additive function operating device eliminating the need of test copies, converts the colored original including photographs and printed matters into electric signals, these signals being output on the color television monitor or full color printer via the control circuit.

Color balance in the conventional full color copy mode has been controlled by adjusting the magnitude of the signals for red, green and blue, or cyan, magenta and yellow (black) constituting the color components by the control key on the control panel. In this case, some knowledge or skill on color mixing has been required for the operation, and this has been difficult for normal users. For example, when the entire page of the original is brownish, color balance can be controlled so as to cancel it. The user has to operate the control key to control the color balance while considering color components of the brown, their ratio and quality. This control is not very easy for the user who has little knowledge about color mixing, often causing operation errors.

This present invention provides an easy-to-use means for color balance control by electronic means to solve the said problems.

For the user with little knowledge about color mixing, it is easy to specify the color to be output as achromatic color (gray) in the original. For example, it can be easily considered that the black character or the paper texture should be adjusted to in achromatic color in general cases. When the original is output on the color display screen or the paper, the user can easily identify if the part to be output in achromatic color (black character or the paper texture) is covered with several colors. He can easily identify the case when the entire paper is covered by colors.

Thus, the second object in the present invention is to provide the color balance control device which ensures that all colors are adjusted as the user desires and that the expected gray part is certainly output in gray, if the user identifies the said colors and specified them, without having to consider the color components.

SUMMARY OF THE INVENTION

The primary object of the present invention is achieved by the digital copying machine provided with an image reading means which obtains the image signal by scanning the original and converting it into the electric signal, an image processing means which provides image processing to the image signal, an image recording means which records the image signal having undergone image processing according to the color material of the CMYK, a first operation means incorporated in the machine and a second operation means located separately from the machine; the first operation means comprising the first operation key, display section, CPU and parameter, and the parameter memory having operation parameters to operate the image reading section, image processing section and image recording section, wherein the CPU inputs the signal from the operation key, converts it into the operation parameter, stores it into the parameter memory and, at the same time, causes the operation parameter setting conditions to be displayed on the display unit, the second operation means comprising the external CPU, coordinates input device, the second operation key, color display device and image memory, wherein the external CPU inputs the signal from the coordinates input device and operation key, converts it into the operation parameter, inputs the image signals obtained from the said image reading means while skipping a part or all of these signals, causes them to be stored into the image memory, and inputs or outputs the operation parameter from the parameter memory through the CPU of the machine, wherein the said second operation means permits part or all of the operations which can be done from said first operation means, the image signal stored in the said image memory is processed on the basis of the parameter in parameter memory or external CPU, the processed image is displayed on the color display unit, and the copy style can be identified before being copied.

The second object of the prevent invention is achieved by the image color balance control device which determines the chromaticity, processing mode and image density by specifying the two-dimensional coordinates, comprising an operation section which produces coordinates, chromaticity signal, processing mode signal and image density signal, a signal converting means which converts the said chromaticity signal into the signal for each of the color components (cyan, magenta and yellow or red, green and blue), a first calculation means to get the coefficient signal value for each of the color components by the calculation of said processing mode signal value, said signal mode value for each of the color components and said density control signal value, and a second calculation means to multiply the image signal value for each of the picture elements obtained from scanning the original, by the coefficient signal value for each of the said component to be obtained from the said first calculation means, and to output the result of this multiplication.

Namely, when the color balance control device according to the present invention is used, color samples are displayed on the color display in advance; if one of said samples is specified by the user, the color balance works towards the color specified by the user, thereby controlling the color balance. Or the color picture elements to be subjected to color balance control are displayed on the color display; when the part to be adjusted to gray is specified, the color balance works so that part turns gray, thereby controlling the color balance. Furthermore, these two types are switched automatically.

The color balance control device also provides density control in addition to color balance control.

BRIEF DESCRIPTION OF THE DRAWINGS

[FIG. 1]
[FIG. 2 ]
[FIG. 3]
[FIG. 4 ]
[FIG. 5]
[FIG. 6]
[FIG. 7 ]
[FIG. 8]
[FIG. 9]

DETAILED DESCRIPTION OF THE PREFERRED EMBODIMENT

Figure 1:
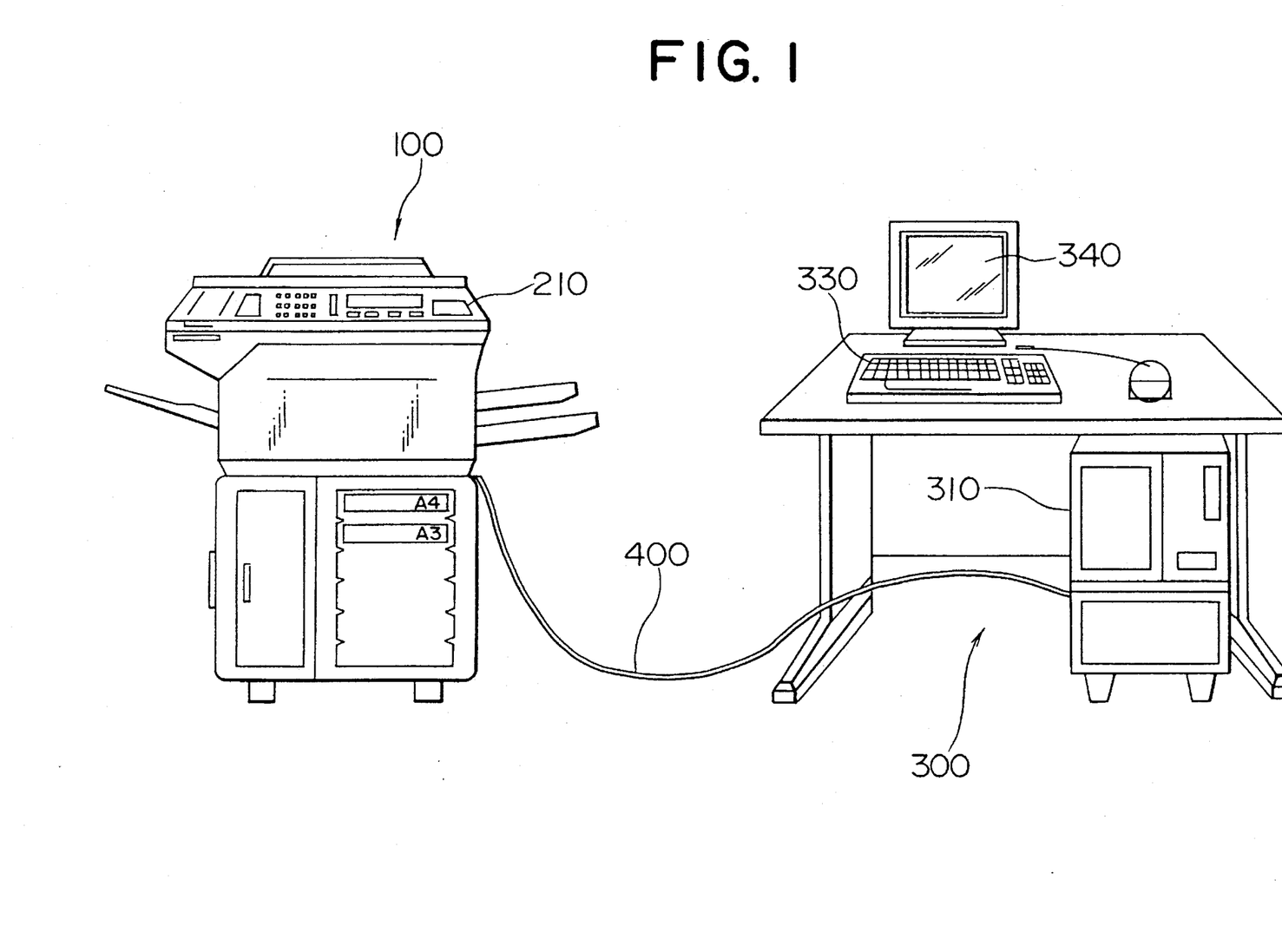
FIG. 1 represents the relationship between the first operation means provided on the side of the copying machine, and the second operation means provided separately.

FIG. 1 represents the configuration of the present invention, wherein 100 denotes the digital copying machine provided with the first operation means 200, and 310 denotes the external CPU (2) (computer), constituting part of the second operation means 300, the first operation means 200 of the digital copying machine 100 and computer 310 being capable of communication by cable 400 or other communication means.

Figure 2:
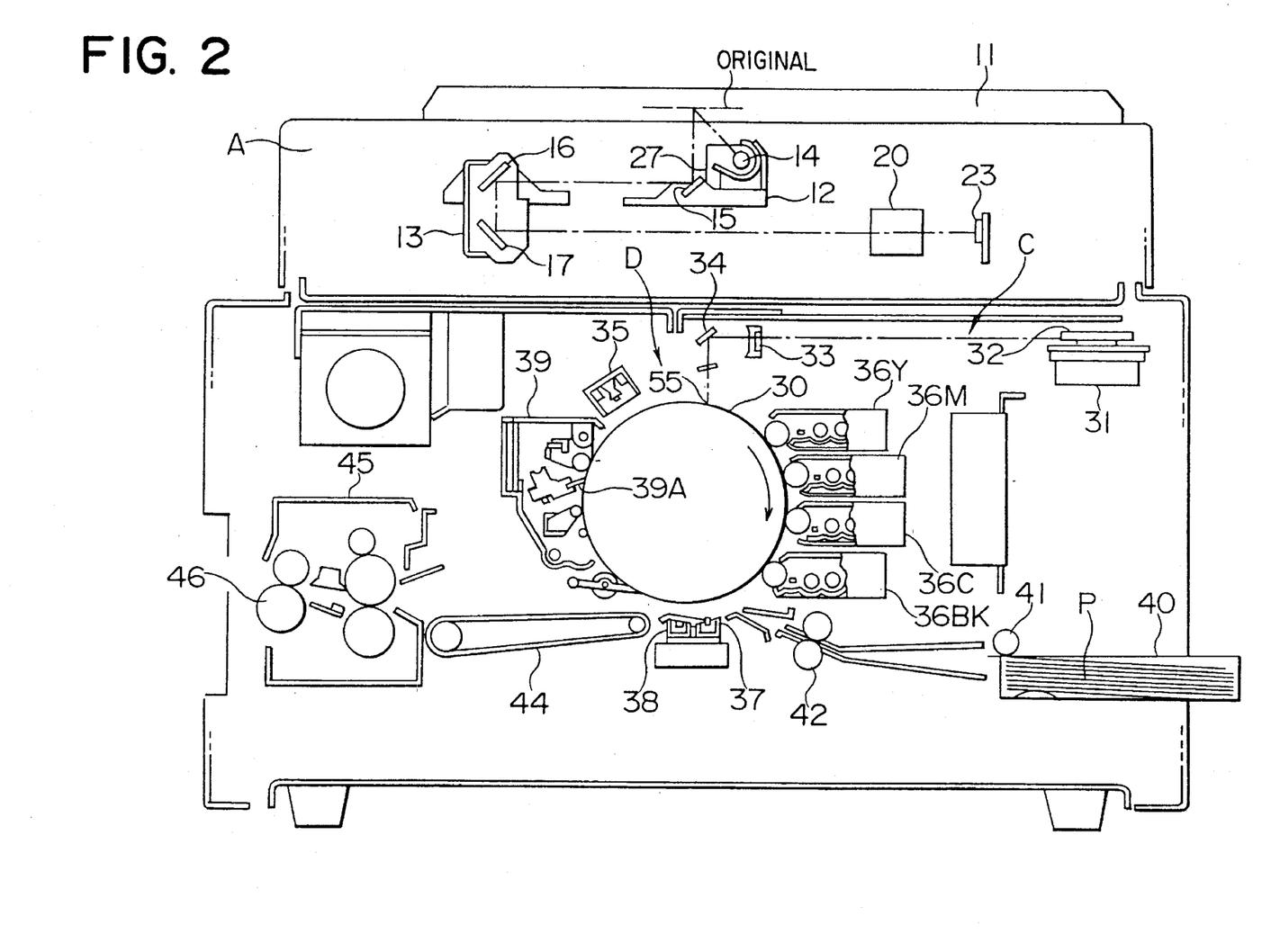
FIG. 2 is a sectional view representing one embodiment of the digital copying machine.

FIG. 2 is a sectional view representing an embodiment of digital copying machine 100. This digital copying machine 100 comprises image reading section A, image processing section B, laser writing section C and image forming section CPU D.

The top of the copying machine is provided with the original mount comprising the transparent glass plate, and the table 11 comprising the original cover to cover the original placed on the original mount. The position below the original mount of the machine is provided image reading section A comprising first mirror 12, second mirror 13, main lens 20 and color CCD 23. The first mirror unit 12 is provided with exposure lamp 14 and first mirror 15 is mounted so that it can be moved straight in the direction parallel to the said original mount and to the left and right of the drawing; it optically scans the entire surface of the original. The second mirror 13 is provided with the second mirror 16 and third mirror 17 designed in an integral structure, and makes straight movement in the same direction to the right and left at the speed half that of the first mirror 12 so as to ensure the specified light path at all times.

Needless to say, second mirror 13 moves parallel to the original mount as in the case of the first mirror 12. The image of the original placed on the original table illuminated by exposure lamp 14 is formed on the color CCD 23 via first mirror 15, second mirror 16 and third mirror 17 by main lens 20. The above description relates to the scanning operation. When the scanning has completed, the first mirror 12 and second mirror 13 return, waiting for the next copying operation.

The image data of each color obtained from said color VVF 23 is processed by the image processing section B and is output from laser writing section C as image signal.

Laser writing section C is composes of drive motor 31, polygon mirror 32, f θ lens (not illustrated), compensating lens (not illustrated), semiconductor laser (not illustrated) and its drive circuit (not illustrated). The drive circuit within the laser writing section provides on-off control of the semiconductor laser on the basis of the said signal.

Image forming section CPU D comprises electric charger 35, image exposure section 55, developers 36Y, 36M, 36C and 36BK, transfer unit 37, separator 38 and cleaning unit 39 laid out on the circumference of photosensitive drum 30, an image former, and paper feed cassette 40 located close to sensitive drum 30, feed belt 44 and fuser 45.

For said developer 36Y, 36M, 36C and 36BK, developer 36Y is located on the most upstream position of the periphery of photosensitive drum 30, and developer 36BK accommodating the black toner BK is located on the most downstream position. The color toner and black toner stored in developers 36Y, 36M, 36C and 36BK will not be described here since the extensively known toners are used.

In the said copying machine, each process of said image reading section A, image processing section B, laser writing section C and image forming section CPU D are operated by the pressure of the copy button installed on the operation unit outside the machine, thereby forming the colored copy image. Namely, copying operation is started when the image signal from image reading section A has been input into laser writing section C through image processing section B. That is, photosensitive drum 30 rotates in the clockwise direction as illustrated by the arrow mark. It is charged uniformly by the electric charger 35 at first. At image exposure section 55, the operation is performed by laser beam to laser writing section C for the yellow (Y') image corresponding to the image of the original, thereby forming a Y-image electrostatic latent image. In said electrostatic latent image on the photosensitive drum 30, reserve development due to the Y toner is caused by developer 36Y, and the visible Y toner image is created. In other words, d.c. or a.c. bias voltage is applied to the developer sleeve incorporating the magnet roll of developer 36Y, and non-contact development is caused by two-component non-contact developing powder, forming the Y-toner image. The photosensitive drum 30 which causes creation of the said Y-toner image passes below the cleaning unit 39 which is retracted, and starts the second rotation. Then charging is performed by electric charger 35 and laser beam writing of the magenta (M) image is performed by laser writing section C. Then electrostatic latent image of magenta (M) image is formed on the said Y-toner image. This latent image is reversed and developed by the developer 36M storing the magenta toner, and is turned into M-toner image. This is followed by superimposition and formation of the cyan (C) toner image and black (BK) toner image.

The transfer paper P which is fed sheet by sheet by paper feed roller 41 from the paper feed cassette 40 which stores the transfer paper P as transfer material is, and is then fed out onto photosensitive drum 30 by timing roller 42 which operates in synchronism with the said toner image on photosensitive drum 30. The toner image on photosensitive drum 30 is transferred on this transfer paper P by the action of transfer unit 37, and is separated from photosensitive drum 30 by separator 38. After that, it is fed to fuser 45 by through feed belt 44, with the toner image facing upward.

The transfer paper P subjected to fusing in said fuser 45 is ejected out of the copying machine, while said photosensitive drum 30 continues rotating. The toner remaining on the surface without being transferred is collected and cleaned by the cleaning unit 39A which has ceased to be retracted, and the machine waits for the next copying operation.

The digital copying machine 100 is provided with first operation means 200 which is built in the machine. The first operation means 200 comprises the first operation key 210, display section 220, internal CPU (1) 230, parameter and parameter memory 240.

The second operation means 300 which can be communicated by external cable 400 is provided with CPU (2) 310, coordinates input device 320, second operation key 330, CRT display 340 which is capable of full color display and image memory 350.

The storage device of the CPU (2) 310 stores the program which commands functioning as second operation means 300, so execution of said program causes operation as second operation means 300. Unless said program is executed, digital copying machine 100 can be operated only by the first operation means 200. The CPU (2) 310 has computer functions original thereto.

The first operation means 200 on the digital copying machine 100 is provided with various buttons 210 including the copy buttons for operation and LCD (liquid crystal) or LED display section 220.

Figure 3:
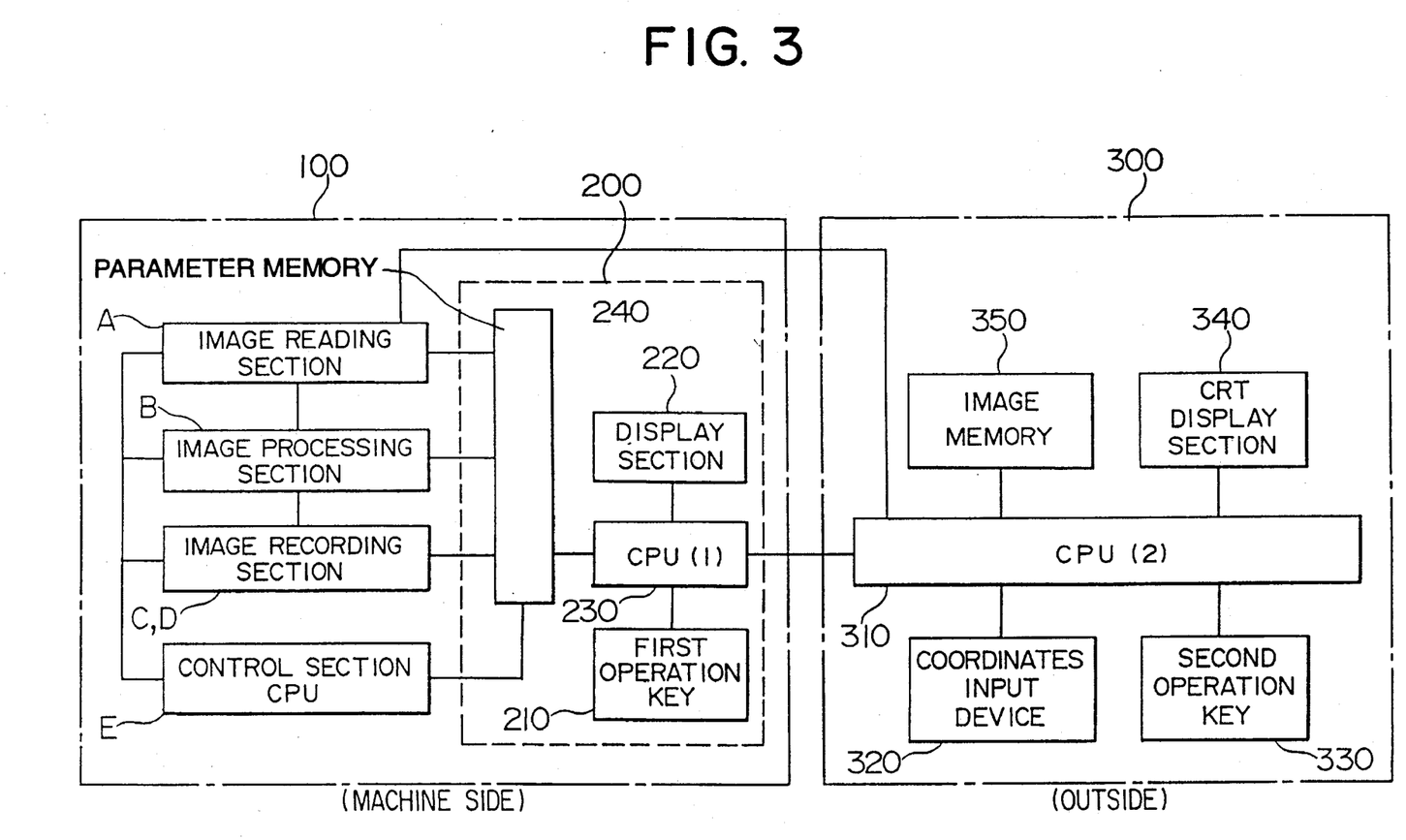
FIG. 3 shows one embodiment of the function block according to the present invention.

FIG. 3 shows an embodiment of the function block. The block can be divided into two portions; the portion on the machine (digital copying machine 100 and first operation means 200) side and the external portion (second operation means 300). The portion on the machine side comprises image reading section A, image processing section B, image recording sections C and D, control CPU E, parameter memory 240, CPU (1) 230, display section 220 and first operation key 210; this portion is the "digital copying machine." The external portion comprises CPU (2) 310, image memory 350, CRT display 340, and second operation key 330 (keyboard and mouse); this portion corresponds to the personal computer and work station.

The parameter memory is a non-volatile SRAM to store necessary operation parameters.

The information input from first operation key 210 is converted into the operation parameter by CPU (1) 230, and is stored in parameter memory 240. The display section 220 references the operation parameter value inside parameter memory 240, and displays the operation parameter value on the LED or LCD panel on display section 220. In the same way, the information input from second operation key 330 is processed by CPU (2) 310, is fed as operation parameter to parameter memory 240 via CPU (1) 230, and is stored. At the same time, part or all of the parameter set states are displayed on the display section 220 and external CRT display 340.

Namely, the parameter for additive function can be set from either first operation key 210 or second operation key 330. When the operation parameter is set from one of these keys, the operation mode is displayed on display section 220 and CRT display 340.

Assume that the original is already placed on the original mount.

Select the copy paper size, and input this information from one of the operations keys 210 and 330. For example, if the first operation means 200 is used for input, the information is stored in parameter memory 240 via first operation key 210 and CPU (1) 230. If second operation means 300 is used, the information is stored in the parameter memory 240 via second operation key 330, computer 310 and CPU (1) 230. The second operation key 330 is provided with a copy style button to confirm the copy style. Turning on this button causes the magnification, color and style for copying to be displayed on the CRT display 340. Firstly, the ON signal of the copy style button is fed to the parameter memory via second operation key 330, CPU (2) 310 and CPU (1) 230 and stored there. The CPU (1) 230 and CPU (2) 310 stores the ON signal in parameter memory 240, and disables part of the parameter changes by operation keys 210 and 330, until it is released. This prevents the operation error to a certain extent. Furthermore, CPU (2) 310 is ready to accept the image signal from image reading section A. On the other hand, the control CPU E controls the operations of the image recording section comprising the image reading section A, image processing section B, laser writing section C and image forming section CPU D, and always supervises parameter memory 240. When it detects the ON signal, image reading section A scans the original, and sends the image signal to CPU (2) 310. The CPU (2) 310 gives consideration to the picture elements which can be displayed on CRT display 340 and the original mount size and resolution of the image reading section A, and skips the image data as required. Thus the data is stored in the image memory 350. The image data stored in image memory 350 is displayed on CRT display 340. After pre-scanning is completed, the ON signal of the copy style button inside parameter memory 240 is cleared, and the system is again ready for parameter change. The CPU (2) 310 performs simulation of the additive function based on the parameter from parameter memory 240. This enables the system to calculate the magnification, color and style for copying, according to how the parameters are set, and the results are pictorially displayed on the CRT display 340.

Additive functions to be operated from second operation key 330 and coordinates input device 320 may be vertical and horizontal independent magnification, magnification change rate, color control, region specification or any others. It is essential, however, that the parameter representing the content of the additive function be stored in parameter memory 240, and correct function be performed when the parameter is referenced by image reading section A, image processing section B, image recording sections C and D, and control CPU (E).

Repeat confirmation of the copy style on CRT display 340. When the desired copy style is obtained on CRT display 340, press the buttons of first operation key 210 on the digital copying machine 100. Then the copying operation is performed and the hard copy of the copy style displayed on the CRT display 340 is output. Of course, the copy operation may be started by the remote type.

The copy ON signal is firstly stored in parameter memory 240 via the first operation key 210 and CPU (1) 230.

When the CPU (1) 230 and CPU (2) 310 have detected the ON signal in the parameter memory 240, the system disables part of the parameter change made by operation keys 210 and 330, until it is released. When the CPU (E) has detected the ON signal, it controls the image reading section A, image processing section B, and image recording sections C and D. The image reading section A, image processing section B, and image recording sections C and D enter the parameter from parameter memory 240, and copying operation is performed in synchronism.

As described above, the present invention ensures precise operation of the additive function while the copy style is checked, and provides the digital copying machine which does not require test copying for additive function.

Figure 4:
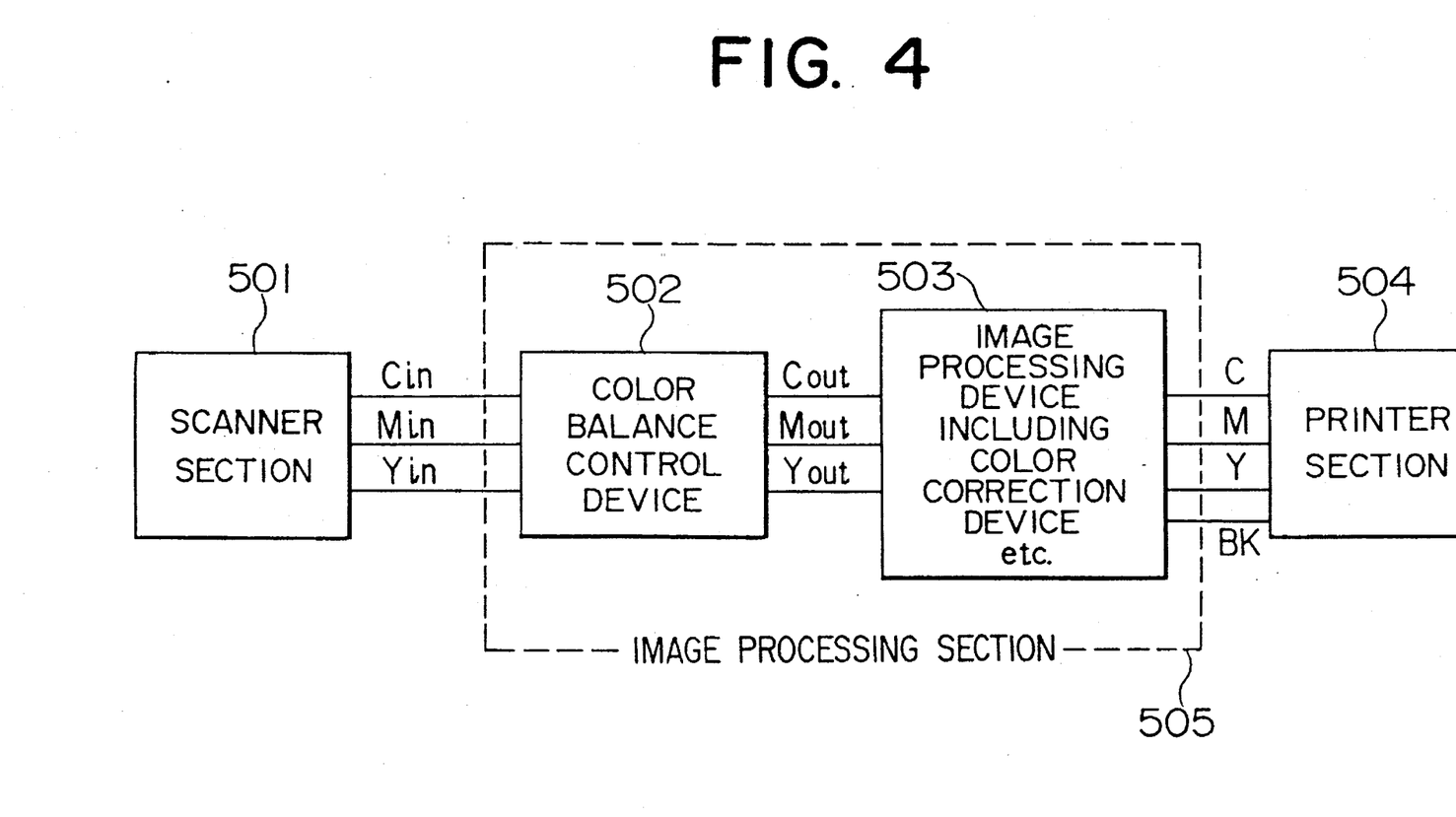
FIG. 4 shows the flow of the image signals in the color copying machine according to the embodiment of the present invention.

As an example of the said additive function, the following describes the case of applying the color balance control device to the color copying machine:

FIG. 4 is a brief illustration of the flow of the image signal inside the color copying machine. The image signals Cin, Min and Yin obtained by operating the original in the scanner section 501 are subjected to color balance control by the color balance control device 502, and are output as Cout, Mout and Yout. Furthermore, after having been subjected to color modification or other processing by image processing device 503, these signals are fed to printer section 504, where they are output as hard copies. In this example, color balance control device 502 is positioned immediately after scanner section 501; it may be located immediately before printer section 504.

The input/output signal of color balance control device 502 is CMY density signal, and is equivalent to the logarithms of the RGB brightness signal used as density signal of the complementary color. Simply reversed brightness RGB signal may be used as input and converted into CMY density after color balance control.

Figure 5:
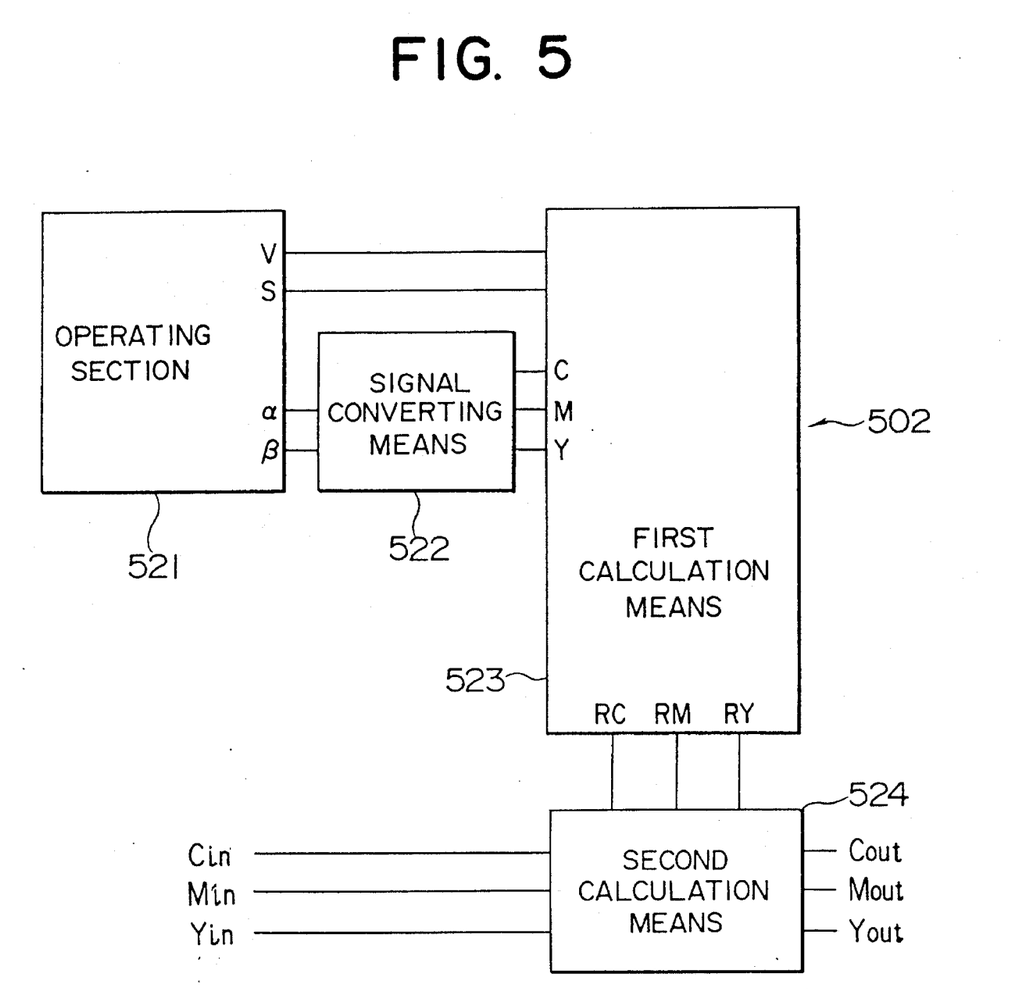
FIG. 5 is a block diagram representing the color balance control device according to the present invention.

FIG. 5 is the block diagram of color balance control device 502 according to the present invention.

The color balance control device 502 comprises operating section 521, signal converting means 522, first calculation means 523 and second calculation means 524. The operating section 521 produces chromaticity signals α, β and γ, processing mode signal s, and density control signal V. Signals α and β are converted into color balance signal CMY for each color component by a signal conversion means, and this signal is fed to first calculation means 523, together with V and s. The first calculation means 523 performs operations using these signal values to get coefficients RC, RM and RY. The second calculation means 524 multiplies image signals Cin, Min and Yin by coefficients RC, RM and RY before color balance control for each picture element, and produces the outputs as image signals Cout and Yout after color balance adjustment.

Figure 6:
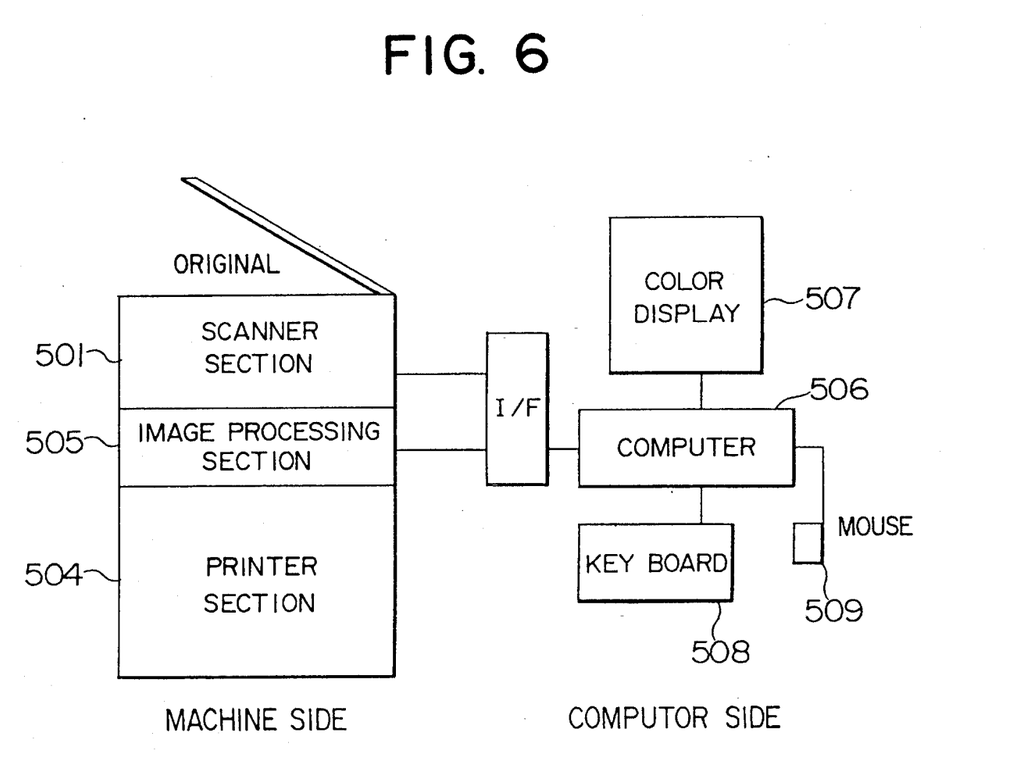
FIG. 6 is a drawing representing the general composition of the color copying machine in the present embodiment.

FIG. 6 represents an overall view of the color copying machine.

The machine comprises scanner section 501, image processing section 505 and printer section 504. Image processing section 505 contains second calculation means 524 as part of the color balance control device 502; it also contains the image processing device including color correction device, etc. 503. They are composed of multiple electronic devices including gate array and memory.

The operating section 521, signal converting means 522 and first calculation means 523 comprises computer 506 having interface with the machine, and software. Said computer 506 is equivalent to personal computer and work station, and its periphery is provided with color display 507, keyboard 508 and mouse 509 to specify the two-dimensional coordinates.

Figure 7:
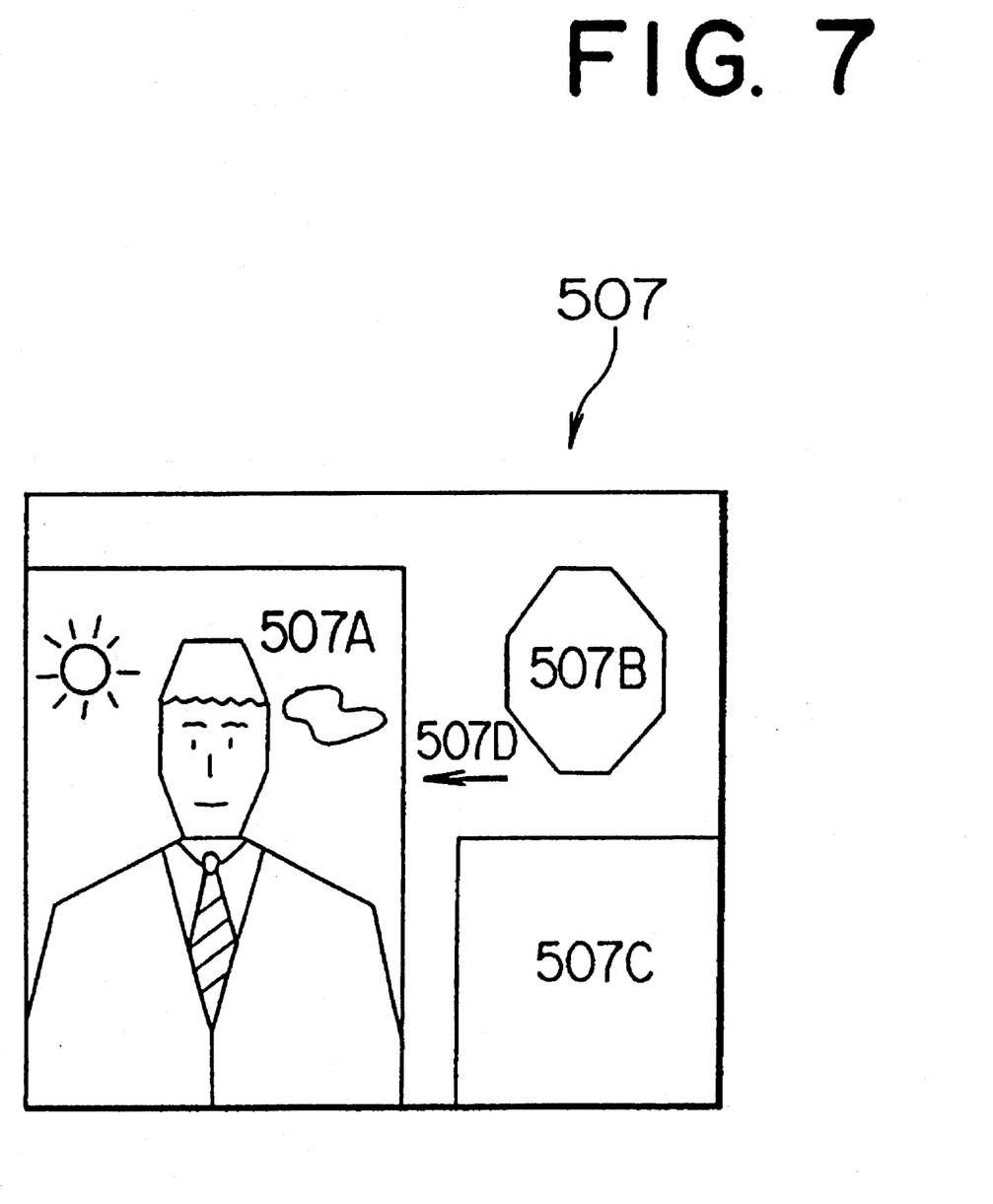
FIG. 7 represents the layout example on the color display.
Figure 8:
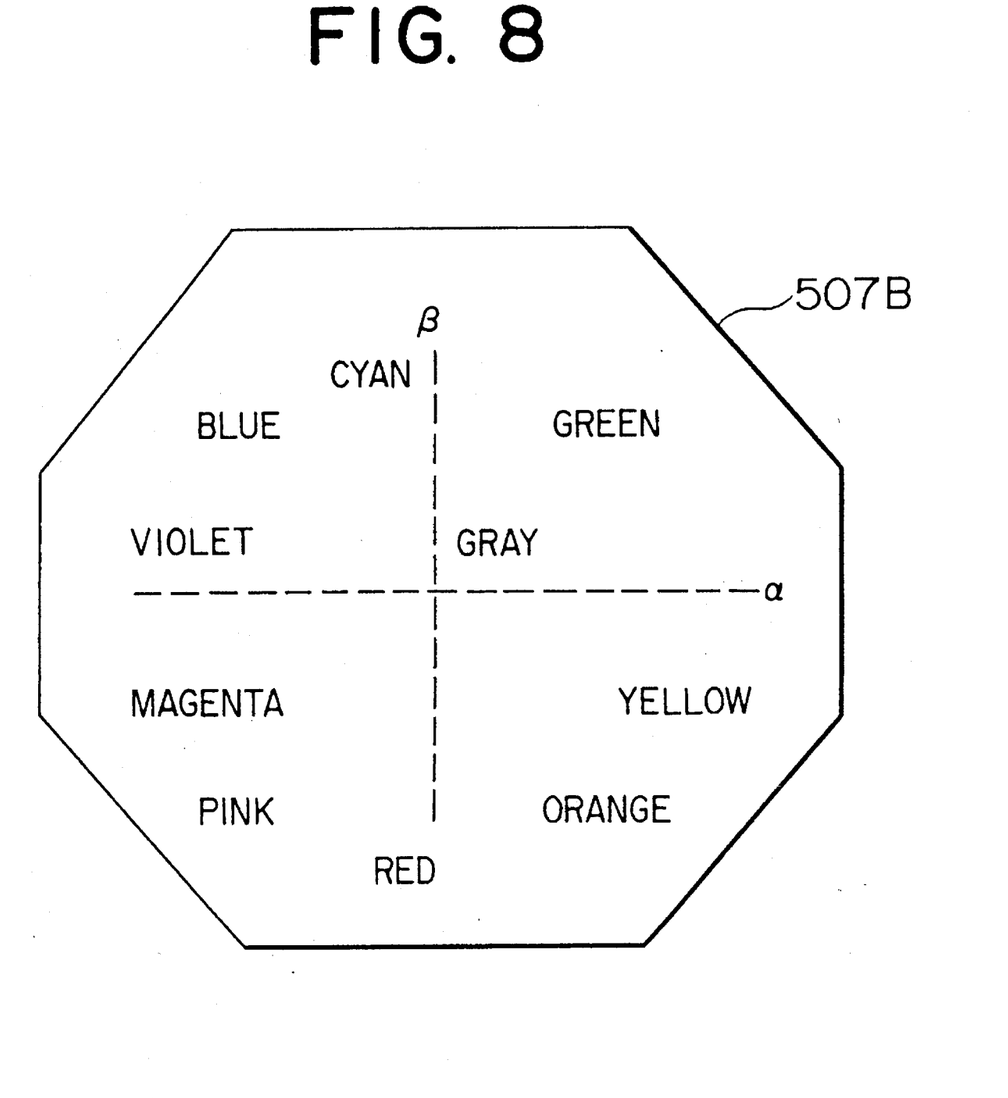
FIG. 8 represents the colors displayed as color samples and their layout.

The top of color display 507 is provided with color image 507A, color sample 507B and operation menu 507C as illustrated in FIG. 7.

The color image is displayed in the area shown by 507A. The color image is obtained by scanning the color original. Since it has a huge amount of picture elements, it is sampled at the pitch of about 1 [picture element/mm], and is stored in the image memory (not illustrated) inside computer 6. The number of picture elements in this case is about 297×420 picture elements in terms of A3 size paper.

The color elements stored in the memory are given as CMY density signal, and they must be converted into the signal of the RGB which belongs to the display system of the color display system, before the color picture elements are displayed. In the present embodiment, this conversion is performed by software. The signal is firstly reversed, and is then subjected to linear masking and other matrix calculation. It is displayed on the display unit after having been processed so that the colors of the original and color image on the color display will agree approximately with each other in standard setting. Said standard setting should be taken to mean the state in which density control and color balance control are not made.

Then the colors whose hue and chroma change continuously according to coordinates are displayed as color samples on the area 507B on the color display.

The colors to be displayed as color samples are determined by the following calculation, when the center of the 507B area is assumed as the origin (zero point) and the coordinate value in the horizontal direction is assumed as $\alpha$ and that in the vertical direction as $\beta$:

$$\begin{aligned} C &= D_0 + 0.67 \cdot \beta \\ M &= D_0 - 0.714 \cdot \alpha - 0.33 \cdot \beta \\ Y &= D_0 + 0.714 \cdot \alpha - 0.33 \cdot \beta \end{aligned} \qquad (1)$$

where $D_0$ is a value representing density. This value cannot be specified; it should not be too small or too great because of the problems involving ease of reading when displayed on the color display unit, precision of calculation, so for the purpose of the present embodiment, half the maximum value ($D_0 = D_{max}/2$) is used.

FIG. 5 shows the relationship between the color and position within the color samples of the area 507B in the present embodiment. That is, the origin $\alpha = \beta = 0$ is an achromatic color, and chroma is intensified as it goes away from the origin. The hue is changed continuously by the angle represented with the origin as an axis.

Figure 9:
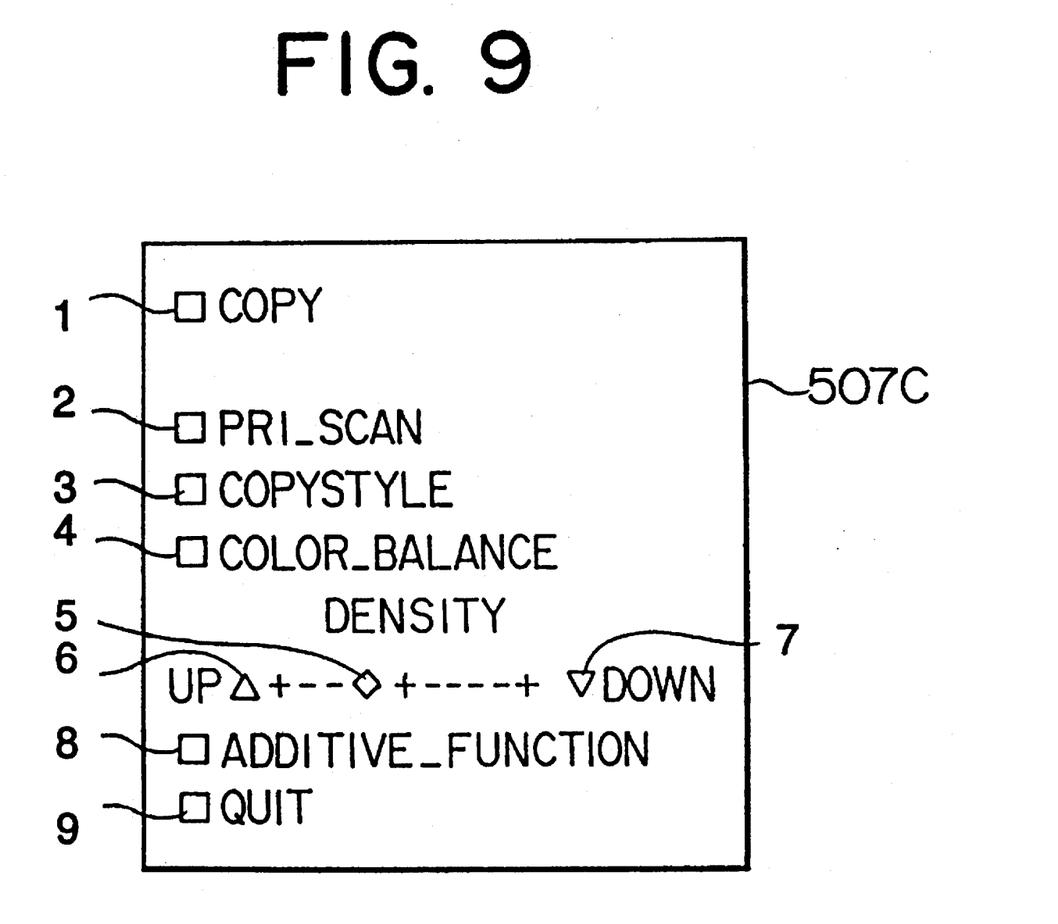
FIG. 9 represents an example of the menu displayed on the color display.

The operation menu is displayed in the area 507C on the color display, as illustrated in FIG. 9, and is used to operate the color copying machine or computer 506. To select the operation, the symbol on color display 507 should be moved by mouse 509, and should be brought to the position (□, △ or ▽) corresponding to the desired operation in the menu and the EXECUTE button installed on mouse 509 should be pressed.

(1) is a copy start switch. Pressing this switch starts copying operation at the current setting.

(2) is a pre-scan switch. Selection of this switch causes the original to be coarse scanned, and the image data to be stored in the image memory.

(3) is a copy style display switch. If this switch is selected, the image data obtained by coarse scanning is subjected to such processing as the density control and the color balance control. The result is displayed on the area A of the display unit as a copy style.

Selection of (4) switch enables color balance control operation.

The density is controlled by selecting △(506) or ▽(507) more than once. In this case, the state of the density control is shown by horizontal movement of ◇ (505).

(8) is an additive function selector switch. Selection of this switch causes the area 507C to be switched to the different menu.

(9) is a switch used to disconnect computer 506 from the machine.

The mode select signal is used to select between conversion of the gray into the specified color and conversion of the specified color into gray. In the present embodiment, the computer 506 is programmed so that the mode select signal is automatically switched according to the symbol position. That is, when the EXECUTE button is pressed, computer 506 reads the symbol coordinates and determines if it is within the area 507A. If it is within the area, the computer produces s=1; otherwise it produces s=0. The result is fed to first calculation means 523.

Firstly, the case of s=1 will be described below:

Firstly, the program is executed on computer 506. This enables computer 506 to operate as part of color copying machine. Display as shown in FIG. 7 is given on the screen of color display 507. Next, place the original on the original mount, and operate mouse 509 to select the pre-scan switch (2) of the menu. Then the scanner scans the original in the coarse mode, and the image data is stored into the image memory inside computer 506 via the interface. Next, when the copy style switch (3) is selected, the color image in the image memory is displayed on the color display 507.

Next, when the color balance switch (4) is selected, the color sample is displayed in the area 507. When the entire original is desired to be brown, the user should position the symbol to the brown portion inside the color sample, and should press the EXECUTE button. This will get him the chromaticity signals α and β and mode signal s=0. The α and β are fed to the signal converting means 522 while s=0 is fed to first calculation means 523.

Signal converting means 522 coverts the chromaticity signals α and β to the CMY color balance signal which is the signal for each color component. The CMY color balance signal in this case can be obtained by calculation of Formula (1).

CMY density signals ($C_{CB}$ $M_{CB}$ $Y_{CB}$) produced from signal converting means 522 are density correction values for color balance control for each color component of the specified color, and are supplied to the first calculation means 523.

The first calculation means 523 firstly gets average value μ. The μ can be calculated from Formula (2).

$$\mu = (C_{CB} + M_{CB} + Y_{CB})/3 \qquad (2)$$

Next, the ratio between $C_{CB}$ $M_{CB}$ $Y_{CB}$ and μ is calculated.

$$\begin{aligned} RC_{CB} &= C_{CB}/\mu \\ RM_{CB} &= M_{CB}/\mu \\ RY_{CB} &= Y_{CB}/\mu \end{aligned} \qquad (3)$$

This means that, when there is any achromatic color having density μ in the original, it is converted into the color represented by $C_{CB}$ $M_{CB}$ $Y_{CB}$. The value $RC_{CB}$ $RM_{CB}$ $RY_{CB}$ calculated in this manner is held until color balance is controlled again.

Next, when the density control switch (6) and (7) are selected, the value of density control parameter V changes. The standard set value of the density control signal V is V=1.0. The value V is changed every time switches (6) and (7) are selected, and the resulting value is maintained.

Furthermore, in the first calculation means 523, Formula (4) is calculated every time color balance control or density control is operated. The final coefficient RC RM RY is supplied via the interface to second calculation means 524 located in the image processing section on the machine side.

$$\begin{aligned} RC &= V \cdot RC_{CB} \\ RM &= V \cdot RM_{CB} \\ RY &= V \cdot RY_{CB} \end{aligned} \qquad (4)$$

In second calculation means 524, every time coefficient RC RM RY is supplied, the values are updated in the register (not illustrated) and maintained there.

Next, when the copy switch is selected, the original is scanned and read, and CMY density signals are obtained in the order of the picture element. They are assumed to be $C_{in}$ $M_{in}$ $Y_{in}$.

Image signals $C_{in}$ $M_{in}$ $Y_{in}$ are fed to second calculation means 524, and are output as $C_{out}$ $M_{out}$ $Y_{out}$ after calculation of Formula (5).

$$\begin{aligned} C_{out} &= C_{in} \cdot RC \\ M_{out} &= M_{in} \cdot RM \\ Y_{out} &= Y_{in} \cdot RY \end{aligned} \qquad (5)$$

The output density signals $C_{out}$ $M_{out}$ $Y_{out}$ are supplied to image processing device including color correction device, etc. 503, and are processed one after another. The output is supplied to printer section 504 as color materials for cyan, magenta, yellow and black. The color balance controlled image is produced from printer section 504.

A series of these operations enables color balance control so as to obtain the color corresponding to the color sample specified on the color display 507.

The following describes the case when the color balance is changed so that s=1, namely, the specified color will be achromatic color.

For example, there is a colored photograph original with brownish color all over due to discoloration, and it contains a portion which must be reproduced in gray. Consider the case of correcting the entire color balance by converting that portion into gray. In this case, the user should position the symbol 507D to the portion which is to be changed to gray inside the color image, and should press the EXECUTE button. The α and β is obtained as color information in this case, and mode signal s=1 is output. Mode signal s is supplied to the first calculation means 523, so the same processing as in the case of s=0 is performed, except for processing in first calculation means 523.

In first calculation means 523, average value µ is obtained by calculation of Formula (2) as in the said case. After that, $RC_{CB}$ $RM_{CB}$ $RY_{CB}$ is calculated according to Formula 6.

$$RC_{CB} = \mu/C_{CB}$$
$$RM_{CB} = \mu/M_{CB}$$
$$RY_{CB} = \mu/Y_{CB}$$
(6)

This means that the color represented by $C_{CB}$ $M_{CB}$ $Y_{CB}$ is converted into gray having density µ in the original.

The subsequent processing is the same as in the said case of s=1.

In this manner, if the original contains the scene which should be expressed apparently in achromatic color, the color balance control is possible by specifying the relevant position.

The above is the description of an embodiment of applying the color balance control device to the color copying machine. It goes without saying that the present invention can be applied to all devices requiring color balance control without being limited to full color copy and colored facsimile.

As is clear from the above description, the present invention provides the color balance device which can be operated also by the users who do not know very much about color mixing.

What is claimed is:

1. An apparatus for processing an image on a document, comprising:

a copying unit including
means for photoelectrically reading an image on the document and for outputting digital image signals,
parameter memory means for storing a parameter,
processing means for processing the digital image signals on the basis of the parameter, and
means for printing the processed digital image signals as a copy image on a recording material with coloring members of cyan, magenta, yellow and black;

an operation unit including
image memory means for receiving the digital image signals from the reading means and for storing the digital image signals,
means for displaying the digital image signals stored in the image memory means as a display image on a screen, and
means for modifying the display image to make a desired image on the screen, for generating a new parameter to convert the display image into the desired image, and for outputting the new parameter to the parameter memory means; and control means to control the copy unit and the operation unit so that the reading means reads the image on the document at least twice, the operation unit receives the digital image signals obtained in a first reading of the reading means and outputs the new parameter to the parameter memory means, and the copy unit processes in the processing means the digital image signals obtained in a second reading of the reading means on the basis of the new parameter so as to produce the desired image and print the produced desired image on a recording material by the printing means.

2. The apparatus of claim 1, wherein the operation unit includes means for reducing the number of the digital image signals so that the image memory means stores the reduced digital image signals.

3. The apparatus of claim 1, wherein the operation unit includes a operation board to operate the copying unit so that the reading means can be controlled to start reading by the operation board.

4. The apparatus of claim 1, wherein the displaying means can display a halftone color image.

5. The apparatus of claim 1, wherein the modifying means includes a coordinate input device to designate a point on two-dimensional coordinates.

6. The apparatus of claim 5, wherein the modifying means designates a region of the image with the coordinate input device and the displaying means displays the designated region of the image on the screen.

7. The apparatus of claim 5, wherein the modifying means inputs data relating to image density, chromaticity and magnification by designating a point on the screen with the coordinate input device.

8. The apparatus of claim 1, wherein the operation unit has a plurality of image processing modes and simulates each of the modes on the screen.

9. The apparatus of claim 1, wherein the operation unit has a central processing unit independent of the copying unit.

10. The apparatus of claim 1, wherein the copying unit includes an operation board with which the copying unit can work independently of the operation unit.

11. The apparatus of claim 1, wherein the reading means outputs a reduced amount of data of the digital image signals to the image memory means in the first reading.

12. An image processing apparatus for adjusting color balance of an image, wherein an original image is photoelectrically converted into digital image signals for each of color components of each pixel with which the original image is reproduced, comprising:

operation means for determining a desired chromaticity, a desired image density and a processing mode to be conducted, and for outputting a chromaticity signal, a mode signal and a density correction signal;

signal conversion means for converting the chromaticity signal into a color balance signal for each color component of cyan, magenta and yellow or for each color component of red, green and blue;

first calculation means for obtaining a coefficient signal for the each color component by calculating the mode signal, the color balance signal for the each color component signal and the density signal; and second calculation means for multiplying the digital image signals of color components of each pixel with corresponding one of the coefficient signals.

13. The apparatus of claim 12, wherein the first calculation means obtains an average value of the color balance signals of the color components, and wherein, when the mode signal indicates a predetermined value, the first calculation means obtains a component ratio signal by dividing the color balance signal of each color component by the average value, multiplies the component ratio signal with the density correction signal and outputs the multiplied component ratio signal, and when the mode signal does not indicate the predetermined value, the first calculation means obtains a reverse component ratio signal by dividing the average value by the color balance signal of each color component, multiplies the reverse component ratio signal with the density correction signal and outputs the multiplied component ratio signal.

14. The apparatus of claim 13, wherein the operation means includes a color display to display the image to be applied with the color balance adjustment on a screen, color samples, and a symbol to indicate two dimensional coordinates on a screen.

15. The apparatus of claim 14, wherein, when the symbol is indicated on the image or on the color samples, the first calculation means outputs the ratio signals by changing the mode signal.

* * * * *